(12) United States Patent
Klemenz et al.

(10) Patent No.: US 8,997,070 B2
(45) Date of Patent: Mar. 31, 2015

(54) EXTENSION MECHANISM FOR SCRIPTING LANGUAGE COMPILER

(75) Inventors: Oliver Klemenz, Heidelberg (DE); Andreas Mueller, Bruehl (DE); Anna Kabala, Reilingen (DE); Lu Zhao, Chengdu Sichuan Province (CN)

(73) Assignee: SAP SE, Walldorf (DE)

( * ) Notice: Subject to any disclaimer, the term of this patent is extended or adjusted under 35 U.S.C. 154(b) by 696 days.

(21) Appl. No.: 13/327,532

(22) Filed: Dec. 15, 2011

(65) Prior Publication Data

US 2013/0159981 A1    Jun. 20, 2013

(51) Int. Cl.
*G06F 9/44* (2006.01)
*G06F 9/45* (2006.01)

(52) U.S. Cl.
CPC .................................... *G06F 8/427* (2013.01)
USPC ............................. 717/143; 717/136; 717/140

(58) Field of Classification Search
None
See application file for complete search history.

(56) References Cited

U.S. PATENT DOCUMENTS

| | | | |
|---|---|---|---|
| 6,219,834 B1 * | 4/2001 | Soroker et al. | 717/145 |
| 6,530,075 B1 * | 3/2003 | Beadle et al. | 717/114 |
| 6,609,130 B1 * | 8/2003 | Saulpaugh et al. | 717/116 |
| 7,219,338 B2 * | 5/2007 | Venter | 717/140 |
| 7,305,666 B2 * | 12/2007 | Burger et al. | 717/140 |
| 7,707,564 B2 * | 4/2010 | Marvin et al. | 717/140 |
| 8,032,859 B2 * | 10/2011 | Meijer et al. | 717/106 |
| 8,656,367 B1 * | 2/2014 | Sharma | 717/130 |
| 8,856,532 B2 * | 10/2014 | Boyer et al. | 713/175 |
| 2004/0194068 A1 | 9/2004 | Warren et al. | |
| 2004/0194072 A1 | 9/2004 | Venter | |
| 2009/0210855 A1 * | 8/2009 | Ramanathan | 717/102 |
| 2013/0019231 A1 * | 1/2013 | Mangard et al. | 717/151 |
| 2013/0104100 A1 * | 4/2013 | Mueller | 717/106 |
| 2014/0149402 A1 * | 5/2014 | O'Neil | 707/723 |

OTHER PUBLICATIONS

"European Application No. 12007376.2, European Search Report mailed Dec. 19, 2014", 6 pgs.

* cited by examiner

*Primary Examiner* — Isaac T Tecklu
*Assistant Examiner* — Hossain Morshed
(74) *Attorney, Agent, or Firm* — Schwegman Lundberg & Woessner, P.A.

(57) ABSTRACT

A method for forming an extension to a scripting language compiler is disclosed. A compiler of a machine receives a source code that has a new keyword to a scripting language of the compiler. An extension compiler module processes the source code to support the new keyword. The compiler and the extension compiler module generate an executable machine code based on a process of the extension compiler module and the compiler.

18 Claims, 7 Drawing Sheets

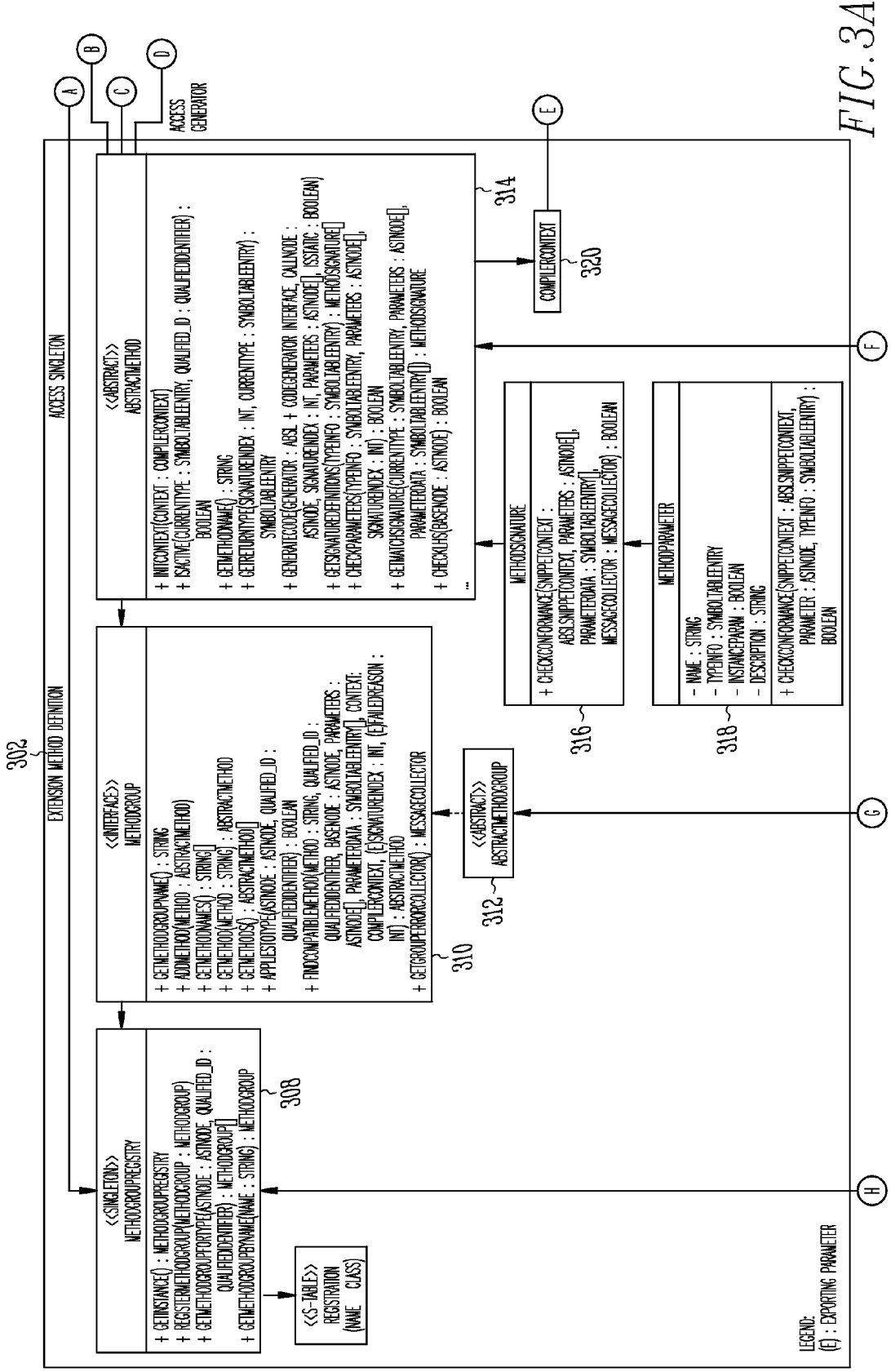

EXTENSION MECHANISM FOR SCRIPTING LANGUAGE COMPILER

TECHNICAL FIELD

The present application relates generally to the field of a compiler, and, in one specific example, to an extension mechanism for a compiler.

BACKGROUND

A compiler traditionally compiles a programming language and to transforms it into an executable code. The compiler performs syntactic, semantic analysis and code generation on the programming language. The compiler can be implemented in the front end or on the backend as well, and forms a complex system to check the grammar definition of the programming language.

A programming language consists of keywords forming the extent of the language. The language itself can be used in different contexts influencing the behavior of the language. However, in some programming language, new functionality cannot be added by introducing new keywords. Therefore, there is a need to allow the working of different groups on the same compiler implementation and to support the usage of the programming language in different contexts not necessarily known to a core development team of the programming language.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the inventive subject matter. It will be evident, however, to those skilled in the art, that embodiments may be practiced without these specific details. Further, to avoid obscuring the inventive subject matter in unnecessary detail, well-known instruction instances, protocols, structures, and techniques have not been shown in detail. As used herein, the term "or" may be construed in an inclusive or exclusive sense. The term "user" may be construed to include a person or a machine. The term "interface" may be construed to include an application program interface (API) or a user interface. The term "database" may be construed to include a database or a NoSQL or non-relational data store (e.g., Google's BigTable or Amazon's Dynamo). The term "business object" may mean an object that represents an entity of a business inside a software application. For example, a business object may represent a person (e.g., an employee of a company) or a concept (e.g., a process within a company) inside an enterprise information management software application.

A method for forming an extension to a scripting language compiler is disclosed. A compiler of a machine receives a source code that has a new keyword to a language of the compiler. An extension compiler module processes the source code to support the new keyword. The compiler and the extension compiler module generate an executable machine code based on a process of the extension compiler module and the compiler.

The scripting language may be compiled into a binary code for execution. The scripting language may follow the principal of reserving keywords. Therefore, all key-words planned in the future should be known and reserved in advance. However, even if new keywords need to be introduced in an ad-hoc manner in future, conflicts with identifiers in existing scripting language snippets can be avoided by a well-chosen structure of the scripting language grammar rules.

Figure 1:
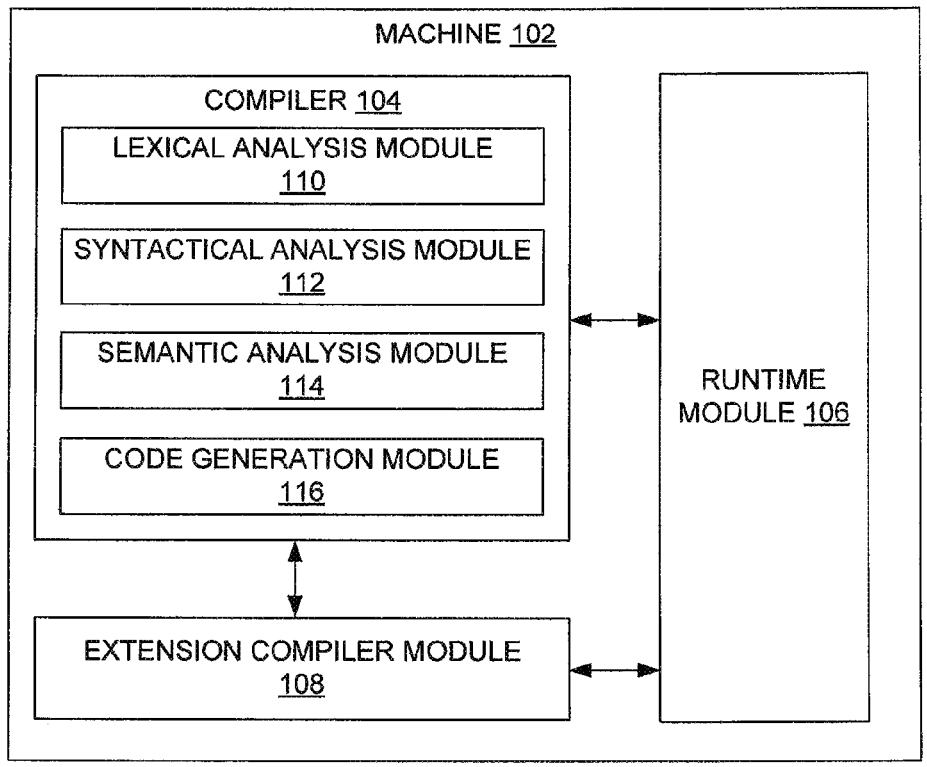
FIG. 1 is a block diagram depicting an example machine within which an extension compiler module may be deployed.

FIG. 1 is a block diagram depicting an example machine within which an extension compiler module may be deployed. In one example embodiment, a machine 102 has a compiler 104, an extension compiler module 108, and a runtime module 106.

The compiler 104 transforms code written in a source language into a different target language, usually binary object code for execution by the runtime module 106. In the case of a cross compiler, the higher lever source language (e.g, scripting language) is translated to a lower level target language (e.g., Advanced Business Application Programming (ABAP) code snippet), which is itself again compiled to executable code in a subsequent step, taking advantage of the existing target language infrastructure and therefore avoiding the need to produce platform dependent binary code.

In one embodiment, the compiler 104 compiles a scripting language (e.g, Advanced Business Scripting Language (ABSL)). To do so, the compiler reads metadata about the ByDesign (ByD) programming model (e.g., Business Objects descriptions) from the backend.

SAP Business ByDesign is a software as a service offering from SAP. The solution can be run on a PC with an Internet connection and a web browser, while the software and data are stored on the host servers. Business applications delivered as an on-demand service via a secure Internet connection and a standard Web browser may be referred to as software-as-a-service (SaaS).

The stateless HTTP channel to the backend may be unidirectional and read the metadata from a Repository Services located in the backend. The generated ABAP code may also be stored in the backend by means of using a Repository Client on the frontend.

The compiler 104 may comprise a lexical analysis module 110, a syntactical analysis module 112, a semantic analysis module 114, and a code generation module 116. Those of ordinary skills in the art will recognize that other components may be included in the compiler 104, such as a pre-processing module and a code optimization phase module.

The lexical analysis module 110 (also referred to as a lexer) converts the input sequence characters of a source document into a sequence of tokens, and may internally be organized into a scanner and a tokenizer. The resulting tokens may be categorized blocks of text, like symbols, identifiers, operators, delimiters and the language keywords itself. In one embodiment, the tokens are described by regular expressions that are interpreted by a tool, generating the lexer code.

The syntactical analysis module 112 (also referred to as a parser) parses the tokens provided by the lexical analysis module 110 to determine the syntactical structure of the source program. In one embodiment, the parser constructs a parse tree (Abstract Syntax Tree—AST), by transforming the linear input token sequence (taken from the lexical analysis module 110) to a tree structure, according to the rules of a formal grammar which describes the language's syntax. Syntactical errors may reported in this phase of the compiler 104.

The semantic analysis module 114 adds semantic information to the parse tree that was produced during the previous syntactical analysis. Also, symbol tables may be populated and semantic checks such as static type checking are performed, potentially rejecting semantically incorrect input.

The code generation module 116 transforms the intermediate representation (AST) to the output language. In case of target platform binary code generation, additional optimization may be necessary to perform the complex CPU register and memory allocations. In one embodiment, the described cross compiler may not produce machine language but another high level language. The code generation may be a transformation to the target language instructions of almost the same granularity as the source language.

The extension compiler module 108 allows different groups to work on the same compiler implementation and supports the usage of the language in different contexts not necessarily known to a core development team. Therefore, the present disclosure introduces a concept to extend the compiler 104 with the extension compiler module 108 described in more detail below. The extension compiler module generates a new functionality from a new keyword in the compiler 104 without modifying the syntax and the semantic of the source code.

The runtime module 106 is configured to execute a binary code generated by the compiler 104 and the extension compiler 108.

Figure 2:
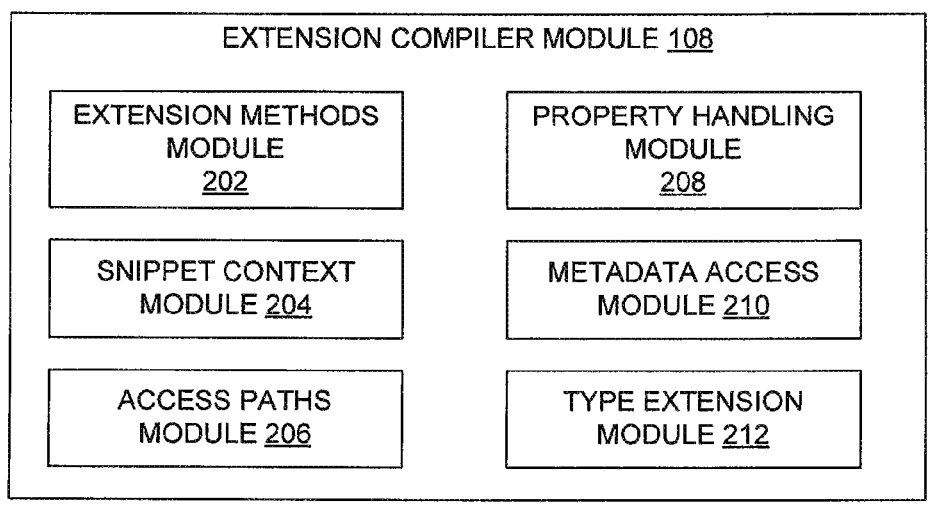
FIG. 2 is a block diagram depicting an example embodiment of an extension compiler module.

FIG. 2 is a block diagram depicting an example embodiment of the extension compiler module 108. The extension compiler module 108 may include an extension methods module 202, a snippet context module 204, an access paths module 206, a property handling module 208, a metadata access module 210, and a type extension module 212.

In one example embodiment, the extension methods module 202 provides a new extension method implementation to the compiler 104 (also referred to as core compiler) of FIG. 1. The extension methods module 202 enables to bind various methods to arbitrary types. This allows, for example, binding core services such as "create", "delete" to BO nodes or to work on collections data types. The extension method framework takes care of the registration and calls back into the method implementation if a matching method has been found for a current processed type. Implementers can add additional functionality to the language, without modification of the grammar. The extension method implementation centralizes the semantical analysis and the code generation into separate classes, where through separation of concerns new functionality can be provided in parallel by several developers. This increases the developer efficiency and support the end-to-end responsibility for one implementation topic.

For example, Extension Methods allow introducing new native language methods by any extender, without changing the core part of the ABSL compiler (intermediary compiler). Extension Methods are bundled via the entity Method Group. A front end compiler already supports the encapsulation of an Extension Method trough object-oriented means, by introducing for each method an own implementation class, taking care of the compiler phases semantical analysis and code generation. The present disclosure introduces the use of an ABSL backend compiler as illustrated in FIG. 3.

Figure 3B:
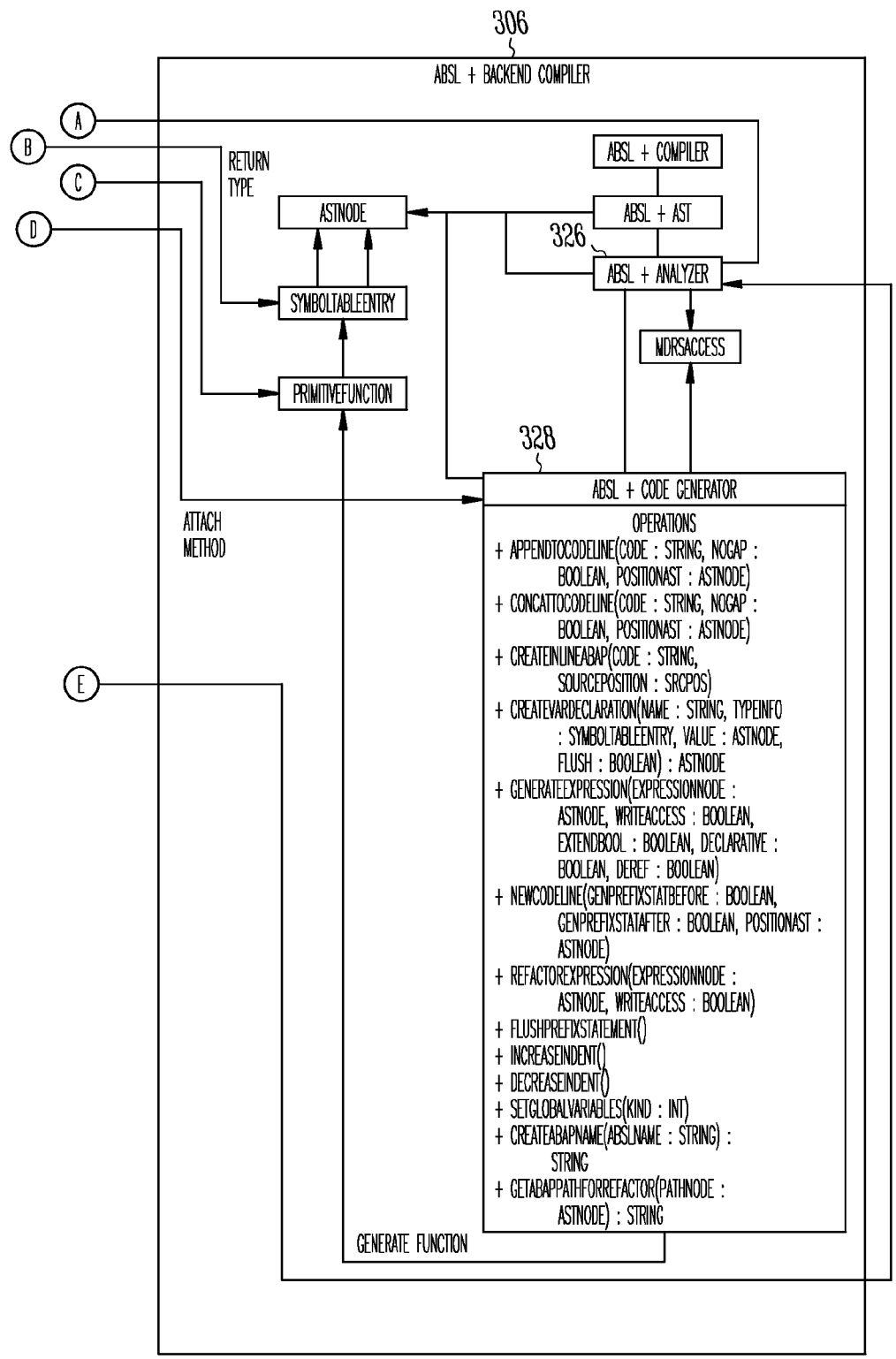
FIG. 3 is a block diagram depicting an example embodiment of an extension method module and a backend compiler.
Figure 3C:
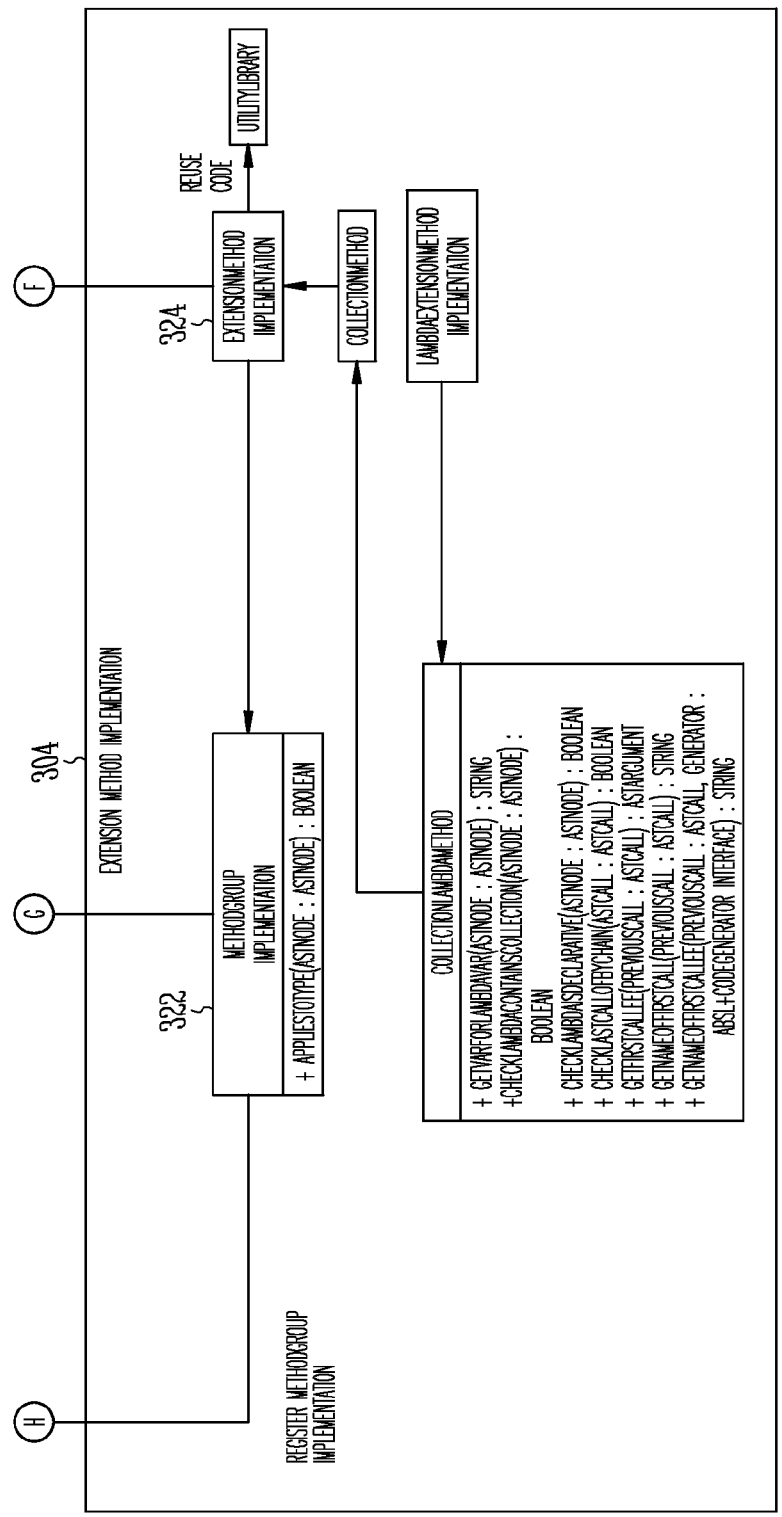

FIG. 3 illustrates an example of architecture of an ABSL+ Extension Methods in ABAP and the integration into the ABSL+core backend compiler. The architecture includes an Extension Method Definition 302, an Extension Method Implementation 304, and an ABSL+Backend Compiler 306.

The Extension Method Definition 302 includes several object classes: a Method Group Registry 308, a Method Group 310, an Abstract Method Group 312, an Abstract Method 314, a Method Signature 316, a Method Parameter 318, and a Compiler Context 320.

The Method Group Registry 308 is the central entry point that offers the registration mechanism for Method Groups containing the Extension Methods. The Method Group Registry 308 loads in its singleton constructor statically the registered Method Groups from a registration table (system table). This S-table consists of two columns, one storing the Method Group name as primary key and the second the ABAP class, which represents the Method Group implementation. In another embodiment, an additional column (isActive) may be added to enable a deactivation mechanism, without removing the registration entries.

As opposed to the static registration, a consumer of the Method Group Registry 308 can register dynamically additional Method Groups during runtime. This registration may not be persisted in the registration table and may live within the current running transaction.

The Method Group Registry 308 offers the following methods:

−constructor
Load the method group registrations from the S-table.
+getInstance( ):MethodGroupRegistry
Obtains access to the MethodGroupRegistry singleton. Static registrations are loaded in the constructor.
+registerMethodGroup(methodGroup:MethodGroup)
Registers additional Method Groups dynamically during runtime not reflected in the registration table.
+getMethodGroupForType(astNode:ASTNode,
   qualified_id:QualifiedIdentifier):MethodGroup[ ]
Returns references to all registered Method Groups matching the current type information. The type information can be derived from the passed AST node and it is an instance of SymbolTableEntry sub-class, which represents the entity in the AST, the Extension Methods should be bound to. The implementation of this method calls the appliesToType method of the Method Group to determine type matching. Qualified identifier can also be passed in to avoid the name clash case.
+getMethodGroupByName(name:String):MethodGroup
Returns a reference to the Method Group matching the name. The Method Group 310 acts as a grouping mechanism for the Extension Methods module 202. The decision if an Extension Method is applicable for a certain type (SymbolTableEntry) is not made on the method but on Method Group level.

The MethodGroup 310 acts as a grouping mechanism for Extension Methods module 202. The decision if an Extension Method is applicable for a certain type (SymbolTableEntry) is made both on method level and Method Group level. On method group level, the common binding check are performed for a certain type, while on method level, more specific binding check are performed toward individual method. The MethodGroup 310 offers, for example, the following methods:

+getMethodGroupName( ):String
Returns the Method Group name.
 +addMethod(method:AbstractMethod)
Registers an Extension Method implementation class for the Method Group. This method may be called in the constructor of the Method Group implementation class.
 +getMethodNames( ):String[ ]
Returns the names of all registered Extension Methods.
 +getMethod(method:String):AbstractMethod
Get a registered Extension Method by name.
 +getMethods( ):AbstractMethod[ ]
Returns all registered Extension Methods of current Method Group.
 +appliesToType(astNode:ASTNode, qualified_id:QualifiedIdentifier):Boolean
Determines if the Method Group applies to the current type. The type (SymbolTableEntry) can be accessed via the passed AST Node. The SymbolTableEntry is not used directly as method parameter, because not only the current AST Node may be necessary to determine the Method Group matching. Ancestor or child AST nodes are accessible via the node hierarchy.
 +findCompatibleMethod(method:String, qualified_id: QualifiedIdentifier, baseNode:ASTNode, parameters: ASTNode[ ], parameterData:SymbolTableEntry[ ], context:CompilerContext, (E)SignatureIndex:int, (E)FailedReason:int):AbstractMethod
Searches for an Extension Method in the Method Group trying to match a compatible method signature.
 getGroupErrorCollector( ):MessageCollector
Returns error message collector for analysis. The Abstract Method Group 312 implements the basic functions of the Method Group 310 for handling the Extension Methods within a Method Group 310. Therefore, all methods expect the appliesToType method to be already implemented generically. AppliesToType method is Method Group implementation specific and may be defined in the implementation class.

In another embodiment, the Abstract Method Group 312 implements the basic functions of the MethodGroup for handling the Extension Methods within a Method Group. Therefore, all methods expect the appliesToType method are already implemented generically. Only the appliesToType method is Method Group implementation specific and has to be defined in the implementation class.

The Abstract Method 314 defines the base class for Extension Methods and provides basic functionality for supporting implementation. Only the Extension Method specific code has to be provided in the implementation classes. The AbstractMethod is referenced by a PrimitiveFunction (SymbolTableEntry) attached to an AST node.

The AbstractMethod may offer the following methods:
 +initContext(context:CompilerContext)
Sets the compiler context before calling a instance method
 +isActive(currentType:SymbolTableEntry, qualified_id: QualifiedIdentifier):Boolean
Returns information, if the Extension Method is active in the current context. Use-case is to restrict usage for example for specific snippet types. The method is defined for the Method Group, but not offered to the consumer if method is in an inactive state. Additionally errors can be returned to the consumer via message collector, explaining why the method is not available.
 +getMethodName( ):String
Returns the name of the method
 +deriveReturnType(signatureIndex:int, currentType:SymbolTableEntry):SymbolTableEntry
Returns the derived return type (SymbolTableEntry) for Extension Method matching the passed type and signature index. The signature index indicates the exact parameter definition if the Extension Method is overloaded. The current type represents the last path item of the Extension Method call. This is used as the method template (final) including the error handling, the request will be delegated to getReturnType( ), which can be implemented by method.
 +getReturnType(signatureIndex:int, currentType:SymbolTableEntry):SymbolTableEntry
Redefined in concrete extension method implementation class to return the return type of the extension method.
 +generateCode(generator:ABSL+CodeGenerator interface, callNode:ASTNode, signatureIndex:int, parameters:ASTNode[ ], isStatic:Boolean)
Used by the code generator to generate ABAP code representing the Method Extension implementation. Again the signature index indicates the exact parameter definition if the Extension Method is overloaded. Additionally, the ABAP code can be different depending on whether the method is call statically or instance-based. The parameters (AST node) are available to access the semantical analysis of the method parameters. Call node can provide necessary information for the call itself. A reference to the ABSL+code generator public interface is available to be used to consume the public services provided by code generator.
 +getSignatureDefinitions(typeInfo:SymbolTableEntry): MethodSignature[ ]
Returns all parameter signature definitions of the Extension Methods. In case of method signature overloading for one method name, several distinct parameter signatures can exist. TypeInfo is required for dynamic signatures definition inside this method.
 +checkParameters(typeInfo:SymbolTableEntry, parameters:ASTNode[ ], signatureIndex:int):Boolean
Checks the parameters of an Extension Method. This method is not necessary to be implemented in every case, as the matching is implemented generically based on the information retrieved from the signature definitions and from the passed parameters. In case that parameters cannot be checked generically, this method allows to implement the check Extension Method specific. A use-case is the lambda expression introduced as parameter for collection Extension Methods.
 +getMatchSignature(currentType:SymbolTableEntry, parameters:ASTNode[ ], parameterData:SymbolTableEntry[ ]):MethodSignature Returns signature where the current parameter types match the expected parameters types. Semantical analysis has to match exactly one parameter signature definition to match the Extension Method. Forwards to MethodSignature checkConformance.
 +checkLHS(baseNode:ASTNode):Boolean
Verify left hand side (last path item before the method itself) to do method-specific binding check. The reason is that even in the same method group, individual method may have specific binding criteria. It is better to have less method groups and put the special check into each method.

In other embodiments, additional methods may be needed to cover additional compiler aspects and dependencies.

The Method Signature 316 represents an ordered list of parameters, which define the signature of an Extension Method. It also provide the method checkConformance( ) to check the parameter list's conformance. It delegates each parameter check to MethodParameter→checkConformance( ).

The MethodSignature offers, for example, the following method:

+checkConformance(snippetContext:ABSLSnippetContext, parameters:ASTNode[ ], parameterData:SymbolTableEntry[ ], messageCollector:MessageCollector): Boolean Checks for signature that current parameter types match the expected parameters.

The Method Parameter 318 defines the signature definition of an Extension Method. It specifies a name, description and the expected type (SymbolTableEntry), and also indicates which parameter is used for instance based access. It defines a method checkConfirmance( ) to check if the passed type (SymbolTableEntry) is assignable to the defined expected type (SymbolTableEntry).

The MethodParameter offers, for example, the following method:

+checkConformance(snippetContext:ABSLSnippetContext, parameter:ASTNode, typeInfo:SymbolTableEntry):Boolean Checks for parameter type to match the expected parameter The Compiler Context 320 gives the implementation of the Extension Method access to the analyzer and in special to the metadata access (MDRS cache). It is set via the initContext method before the first Extension Method call. In one embodiment, the context includes the reference to analyzer itself and reference to current block environment.

The Extension Method Implementation 304 includes a Method Group Implementation 322 and an Extension Method Implementation 324. The Method Group and method definition can have several implementations registered at the Method Group Registry either statically in the registration S-table or dynamically using the registration method at the Method Group Registry singleton.

In the constructor of the Method Group Implementation 322 class, the specific Method Implementation may be added to the Method Group using the AddMethod method.

Most of the Method Group methods may be already implemented in the AbstractMethodGroup 312, so that only the method appliesToType has to be coded to determine, if the Method Group applies to the current type. This determination is based on the current AST node, from which the attached SymbolTableEntry and ancestor and child AST nodes can be accessed. Methods implemented in the AbstractMethodGroup 312 can be overridden to cover more specific implementation. An example for a Method Group is Collection, providing Extension Methods to access and modify collection of nodes and node elements.

The Extension Method Implementation 324 implements the following methods isActive, getReturnType, generateCode, getSignatureDefinitions, checkLHS etc. as those are Extension Method specific. The method implementation is referenced by the primitive function symbol table entry via a generic AbstractMethod reference. The implementation can access reuse coding provided by an UtilityLibrary. An example for a Method Group method is Collection.Add, which allows adding a node or node element to a collection of those.

The ABSL+Backend Compiler 306 accesses the Extension Method implementation during runtime comprising the following backend compiler phases. For example, the ABSL+ Backend Compiler 306 includes an ABSL+Analyzer 326 (semantical analyzer) and an ABSL+Code Generator 328.

The ABSL+Analyzer 326 accesses the singleton of the MethodGroupRegistry 308 to find matching Method Groups 310 for type (SymbolTableEntry) of the currently processed AST node using the getMethodGroupForType method. Having compiled a list of Method Group references, the analyzer checks for the currently processed token, possibly representing a method, in one of the matched Method Groups. If methods matched by name can be identified, the analyzer tries to find exactly one matching method for that also the available parameters in the AST match the signature definition of the method. For this, first the parameters of the method are analyzed recursively, so that their representing AST nodes have an attached type (SymbolTableEntry). The signature definition is retrieved from the identified methods by calling the getSignatureDefinition method. The type info (SymbolTableEntry) of the expected parameters are tried to be matched with the type info (SymbolTableEntry) of the actual parameter AST nodes.

If exactly one Extension Method can be identified, a new type (SymbolTableEntry of sub-type PrimitiveFunction) is created, which has the reference to the Extension Method. Using the getReturnType method the return type (SymbolTableEntry) is determined and linked into the AST node. A reference to the identified Extension Method and its return type information is attached to this new PrimitiveFunction, so that is can be later accessed by code generation via the AST. Based on the enriched AST node and the returning SymbolTableEntry, semantical analysis is processed recursively on the child AST nodes.

The ABSL+Code Generator 328 gets the enriched AST from the analyzer 326 and therefore has access to the attached type/data (SymbolTableEntries). The AST nodes are hierarchically traversed, if the AST node has the reference to a SymbolTableEntry of type PrimitiveFunction, it has an assigned Extension Method of type AbstractMethod. The code generation can be performed using the generateCode method of the Extension Method implementation. Input for code generation are the information accessible via the AbstractMethod reference and AST node for the call. The code generation of the Extension Method parameters and base path are evaluated before the code generation of the Extension Method itself. The resulting ABAP code has to be pushed up in the code sequence. The generated code is appended to the previous generated code in the generator.

The ABSL+CodeGenerator 328 may offer the following methods via a public interface:

+appendToCodeline(code:String, noGap:Boolean, positionAST:ASTNode)

Modify current codeline: input string+current codeline. noGap indicates whether the space is required as the separator in between. positionAST is used to get the position information.

+concatToCodeline(code:String, noGap:Boolean, positionAST:ASTNode)

Modify current codeline: current codeline+input string. noGap indicates whether the space is required as the separator in between. positionAST is used to get the position information.

+createInlineABAP(code:String, sourcePosition:SRCPOS)

Create an AST node for inline ABAP, and put it into prefix statements table for future flush. sourcePosition is the corresponding source position of such AST node.

+createVarDeclaration(name:String, typeInfo:SymbolTableEntry, value:ASTNode, flush:Boolean):ASTNode Create a new variable in ABAP snippet with value if supplied. Flush flag indicates whether the prefix statements flush should be immediately triggered.

+generateExpression(expressionNode:ASTNode, writeAccess:Boolean, extendBool:Boolean, declarative:Boolean, deref:Boolean)

Generate ABAP code for the expression.

+newCodeline(genPrefixStatBefore:Boolean, genPrefixStatAfter:Boolean, positionAST:ASTNode)

Insert current code line into the table for ABAP snippet, then clear it and start the new code line.

+refactorExpression(expressionNode:ASTNode, writeAccess:Boolean)

Refactor the expression and flush the prefix statements after.

+flushPrefixStatement( )

Flush the prefix statements.

+increaseIndent( )/decreaseIndent( )

Increase/decrease the ABAP code indent.

+setGlobalVariables(kind:Int)

Set the global variables in ABAP snippet.

+createABAPName(ABSLName:String):String

Generate a unique ABAP name based on the ABSL name.

The Extension Method implementation has access to the ABSL+CodeGenerator 328, as it is passed as parameter, when calling the method generateCode.

If a template mechanism is introduced in the code generation, the generateCode Method Group has to be adjusted, giving access to the templates mechanism and providing means to consumer pre-filled parameter string template instances and to return a filled string template instance.

Returning back to FIG. 2, the snippet context module 204 models the definition of different snippet metadata and snippet signatures. The script language runs in some specific context. By default, the context may be a Business Object node instance, binding the "this" keyword to the same. The compiler 104 and the language are enhanced to support various contexts by specifying well-defined snippet metadata describing the context the language is used in. By this other contexts that the BO implementation context can be enabled, for example Process Integration condition evaluation, form message type extension, UI controller implementation, application specific libraries. This may require to define different snippet signature from the different runtime contexts.

In one embodiment, snippets have metadata information attached, stored as xRepository Attributes. All snippet types share a set of same information like Project Namespace, BO name, Node name, Custom File Name and Mass Processing indicator.

Additional metadata is store as context specific information:

Service Integration

Snippets of type PIConditionEvaluation store the following metadata

Outbound BO Name/Namespace
    Service Integration Name (PIName)
    Condition Type (SnippetSubType)
    BO Extension Snippets of type XBODetermination store the following metadata Extended BO Name/Namespace
    Extensibility Flag
    Form Message Type Extension Snippets of type FMTExtension store the following metadata FMT Name
    FMT Type
    FMT Data Type
    FMT Root Element To allow seamless enhancement and integration of new contexts for ABSL, an extensibility mechanism shall be introduced to support the storage of additional information. As the script files are always created in the ByDesign Studio frontend, also the snippet metadata are specified there and stored in the xRepository. There is not use-case for changing the script file metadata after creation.

The ABSL+Backend Compiler (306 of FIG. 3) has to evaluate this information during compilation, depending on the processed snippet type, to establish the correct context the ABSL code lives in.

Currently ABSL snippets mostly have no signature definition, like for example BO actions and event implementations. There are two use-cases which introduced parameters, but currently these parameter definitions are more or less hard-coded for the snippet types.

The two use-cases currently are:

Service Integration

Snippets of type PIConditionEvaluation have the following parameters

Importing:InReconciliation:Boolean
    Returning:IsActive:Boolean
    Form Message Type Extension Snippets of type FMTExtension have the following parameters Importing:FormData:FMTType From these use-cases two different types of signatures can be derived:

Static signature per snippet type (Service Integration use-case)

Signature defined as Transformation Definition and the Transformation Definition name stored as script file metadata.

Specific signature per snippet instance (Form Message Type Extension use-case)

Each Form Message Type extension has one parameter FormData, but this parameter can always have a different type, depending on the form message, that is extended.

Therefore the signature cannot be stored statically as Transformation Definition, but the signature itself must be modeled as script file meta data As mixed mode, the static part of the signature can be modeled as Transformation Definition, where dynamic parts are expressed by an any typing. The any types are then concretized in the snippet metadata.

The ABSL runtime dynamically calls the snippet implementation, reading out the signature definition from the MDRS object transformation definition before. This call shall be done exactly as already done for the library functions, also represented by transformation definitions.

The access paths module 206 accesses different data paths defined in the scripting language architecture (e.g. ByDesign of SAP of Germany). The scripting language is based on a programming model. Primary artifact is the entity BO defining a model for business data. Therefore, the primary access paths in the language are BO instances that can be accessed and from which can be navigated to additional data. Different snippet contexts also may require different access paths. For example, in the form message type extension, also deeply structure data types can be accessed. In the UI controller implementation the UI model needs to be accessed.

In one embodiment, default access paths are BO node paths. Snippets of type FMTExtension introduce a new type of paths with the parameter FormData. This path basically represents a message type related path consisting of message nodes and message elements.

To easily enable in future new paths (e.g. path in the data model of the UI Controller . . . ) an extension mechanism is needed to support a seamless integration of the compiler phases, semantical analysis and code generation. Additionally support for code completion shall be possible, although code completion is currently out-of-scope for the backend compiler and is still handled by the front-end compiler.

New paths will introduce new sub-types of SymbolTableEntries, representing the context specific path expression in the compiler during analysis and code generation.

The following features are covered:

Semantic checks for path existence and error handling

Consumption of currently processed AST node and corresponding SymbolTableEntry

Determination of resulting SymbolTableEntry

Code Completion support (currently out-of scope)

Code generation

Code generation shall be aligned as much as possible with the standard code generation. In exceptional cases, if a different code generation is necessary, implementation of the code generation shall be externalized based on the context.

That means that context specific generation shall not be included into the core code generation but delegated into context specific implementation classes. As anyway a new SymbolTableEntry is introduced in that case, the code generation could be delegated using this object.

The property handling module 208 controls the semantical analysis by specifying evaluation properties and restricting the access to the ByD platform. The ByD architecture defines properties for the enterprise service framework and for the public solution model among others. These properties need to be evaluated efficiently and in correspondence to the defined snippet context. Instead of hard-coding the evaluation, a visitor pattern may be implemented allowing to contribute to a property value when queried. For example, when having a look at the read-only properties, there are many contributors that can decide whether a element or node is read-only or not.

The ByD architecture defines several properties on Business Object modeling entities to control the access by consumers. Examples are the ESI properties, like Read-Only on elements, Create Enabled and Delete Enabled on nodes and associations and PSM properties like Released and Write-Enabled. Access properties are grouped according to their semantics, so that for example ESI Read-Only and PSM not Write-Enabled are interpreted as one Read-Only information.

The Read-Only property has an extraordinary role among the other access properties, as it has various sources that contribute to the concrete value. The following access restrictions are in place forming the Read-Only flag known to the ABSL+backend compiler:

ESI Properties

Read-only property

Public Solution Model

Read-only if not PSM write enabled (BO, Node, Node Element)

One-Off mode (Restricted mode for Customer-Individual Solutions)

Only read-only access to ByD BOs (incl. actions)

Write-access to partner BOs

Service Integration

Snippets of type PIConditionEvaluation have the following restriction

Only read-only access to partner BOs and ByD BOs

Form Message Type Extension

Snippets of type FMTExtension have the following restriction

Write-access to message type extensions of the partner

Read-only access to message type elements defined in core ByD

Read-only access to partner BOs and ByD BOs

Previously realized using a separate isAssignable flag in front-end compiler

All situations that semantically express a "Read-Only" classification of a ByD content, shall be flagged accordingly, and centrally evaluated by the semantical analysis. Extension implementations can contribute to this "Read-Only" by setting it to true. Once it was set in cannot be reverted to false.

The access properties need to be interpreted during semantic analysis by the ABSL+backend compiler. If properties forbid write access to ByD content, the compiler shall react with respective compiler errors.

The PSM Released information shall be also respected in the analyzer. It would be possible to already analyze it in the MDRS access class, so that a consumer doesn't need to know about this flag as done in the front-end compiler. Drawback is then, that it's not possible anymore to distinguish between not existing and not released content.

The metadata access module 210 accesses centralized meta data and enhances the access with additional data. To avoid duplicate retrieval of meta data, a central meta data accessor may take care of the read and buffering logic. Additional extenders are able to plug into the retrieval of meta data, automatically taking part into the buffering and retrieval logic, so that all consumers benefit from it. Performance optimizations can be done by, for example, putting an MDRS (meta data repository) cache into a shared memory. This abstraction leaves those details for consumers out, but allows them to concentrate on how to load the meta data.

Different access paths need different metadata. Currently all metadata is available in the MDRS, therefore the ABSL+ backend compiler has access to a MDRS cache.

To support the access of Meta Object information not already available in the MDRS cache, the MDRS cache needs to be extended. As this may only be needed depending on the context of the access path, also the reading of metadata shall be extendable as well.

To support this provisioning of new metadata, content needs to be made available via an interface that can be implemented. The search over the provided content can be implemented generically depending on the data MO Type, Namespace and Name.

The type extension module 212 extends the language with additional types. This deeper integration supports the extension compiler module 108 to include new types, allowing it to define the semantical check and how the new type will be transformed into ABAP.

In one embodiment, the type extension module 212 introduces new functionality in ABSL may require the introduction of new types, which were not needed before or made no sense at all. For example, the type specification collection may be useful in the context of collection handling enablement.

The introduction of type extension comprises:

Creation of types

Creation Type

Explicit type creation:

Specification of an explicit data type

Implicit type creation:

Derivation of the data type from another modeling entity (e.g. BO node)

Own type definition

Currently not within ABSL. Separate entity definitions, like BO Language and FMT Types are available to create data types Assignability Default is that the new type is not assignable to any other type This is checked generically in semantical analysis Libraries can be offered to allow conversion, e.g. ToString( )

Default can be overridden to make type assignable/castable to other existing types This needs to be checked in an exit implementation Code generation Needs to be realized in an exit implementation to the created type that is used during code generation from different contexts.

Figure 4:
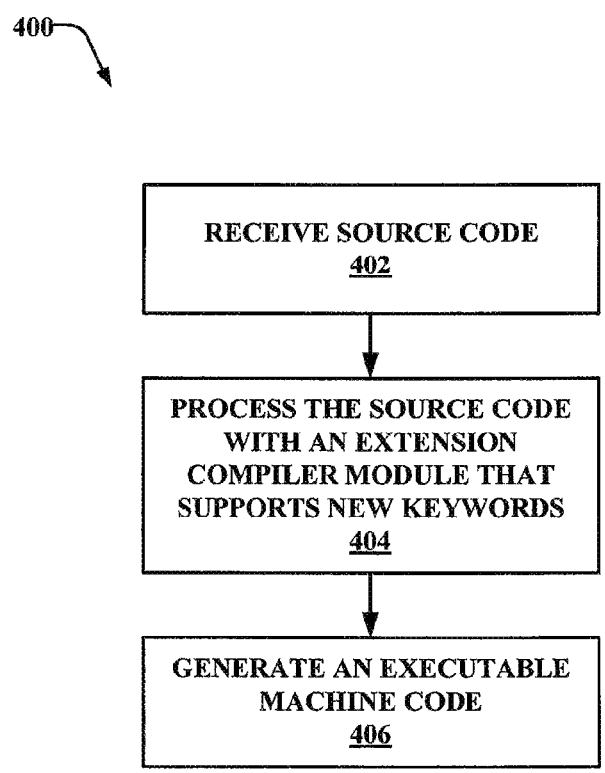
FIG. 4 is a flowchart depicting an example embodiment of a method for an extension compiler module.

FIG. 4 is a flowchart 400 depicting an example method for an extension compiler module. At operation 402, a source code is received at a compiler of a machine. The source code comprises a new keyword to a scripting language of the compiler. For example, the scripting language may be a language configured to create and/or model business objects.

At operation 404, an extension compiler module configured to support the new keyword processes the source code. In one embodiment, the extension compiler module generates a new functionality from the new keyword in the compiler without modifying the syntax and the semantic of the source code.

At operation 406, an executable machine code is generated based on a process of the extension compiler module and the compiler.

Figure 5:
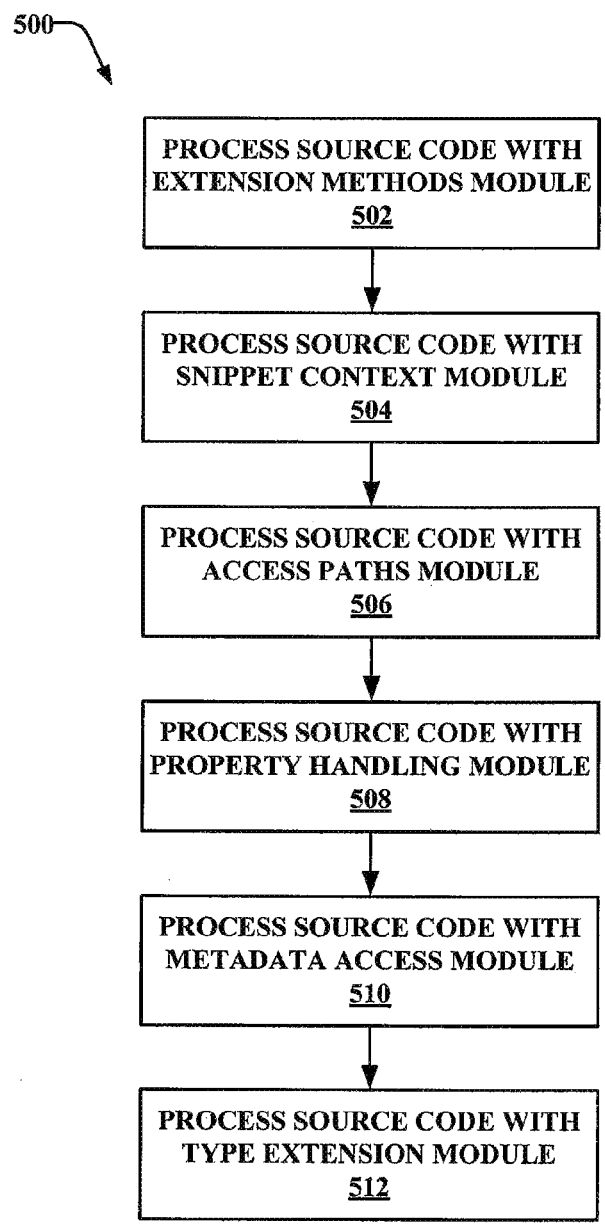
FIG. 5 is a flowchart depicting another example embodiment of a method for an extension compiler module.
Figure 6:
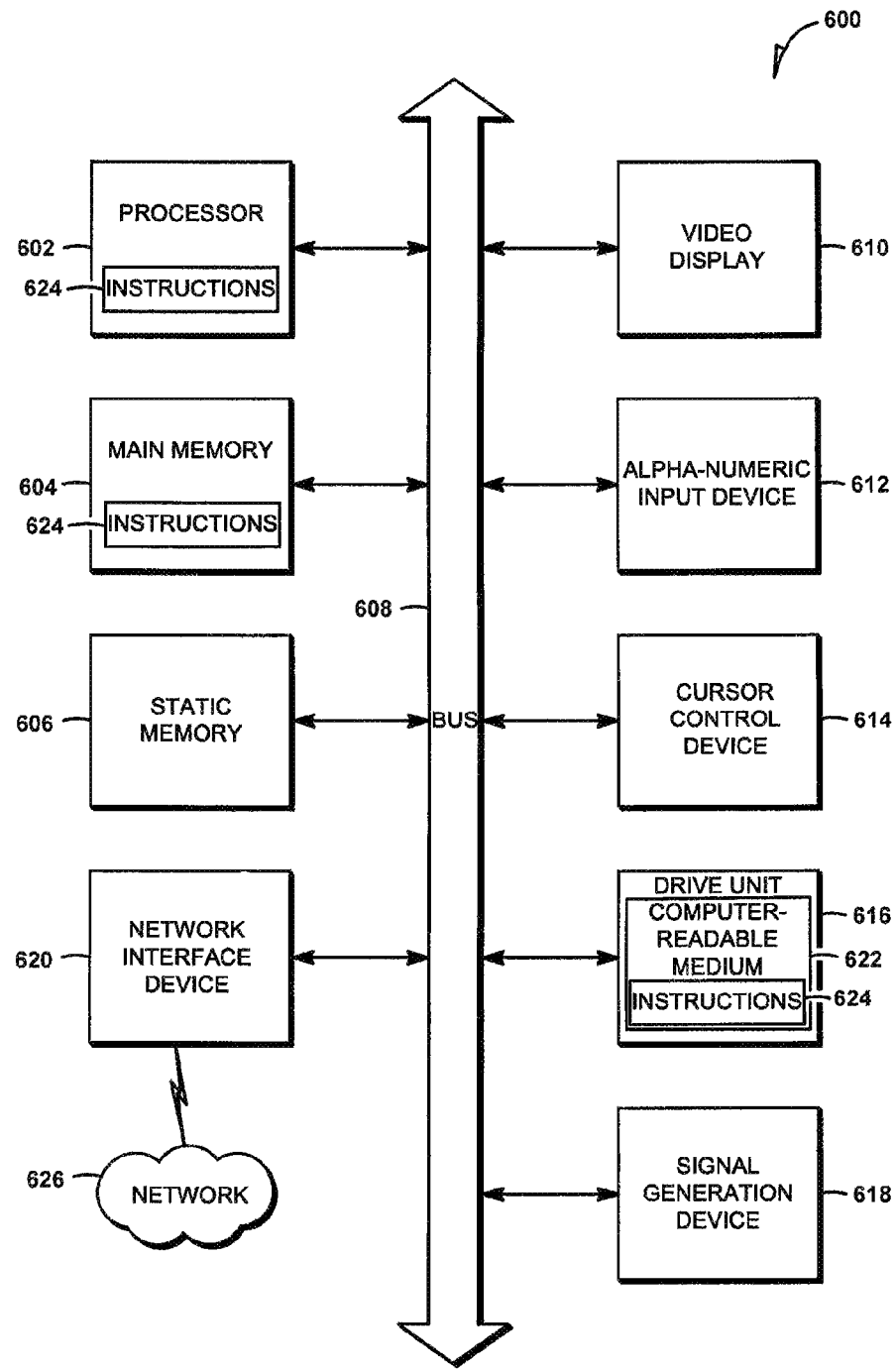
FIG. 6 is a block diagram of an example embodiment of a computer system on which methodologies described herein may be executed.

FIG. 5 is a flowchart 500 depicting another example method for an extension compiler module. At operation 502, an extension methods module processes the scripting language of the source code. At operation 504, a snippet context module processes the scripting language of the source code. At operation 506, an access paths module processes the scripting language of the source code. At operation 508, a property handling module processes the scripting language of the source code. At operation 510, a metadata access module processes the scripting language of the source code. At operation 512, a type extension module processes the scripting language of the source code.

As previously described, instead of direct modification of the core compiler the compiler extension, the present disclosure allows to decouple implementations by introducing well-defined interfaces. This segregation of duty makes implementations of new language extensions and features more easier. Additionally more groups can be enabled to work on those extensions and features independently without disturbing or locking each other in development objects. The compiler is much easier to understand as well defined interfaces exist.

The implementation of one feature can be centralized into one implementation class, instead spreading the implementation of one feature across the whole compiler, like done in prior art. The extend of one feature implementation can be seen at one glance, and one doesn't get lost in the compiler code not knowing which part belongs to which feature implementation. Additionally the language can be leverage to many more contexts more easily, as all context related parts are externalized into modeled parts or well-defined interfaces.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   receiving a source code at a compiler on a machine, the source code comprising a new keyword to a scripting language of the compiler;
   processing, using a processor of the machine, the source code with an extension compiler module configured to support the new keyword;
   the extension compiler module is further configured to support various contexts by specifying snippet metadata describing the context in which the language is used and define different snippet signatures from different runtime contexts; and
   generating an executable machine code based on a process of the extension compiler module and the compiler.

2. The computer-implemented method of claim 1, wherein the compiler is configured to:
   analyze a syntax of the source code;
   analyze a semantic of the source code; and
   generate the executable machine code based on the syntax and semantic of the source code.

3. The computer-implemented method of claim 2, wherein the extension compiler module is configured to generate a new functionality from the new keyword in the compiler without modifying the syntax and the semantic of the source code.

4. The computer-implemented method of claim 1, wherein the extension compiler module is configured to bind a method to an arbitrary type with an extension method module.

5. The computer-implemented method of claim 1, wherein the extension compiler module is configured to enable access to a plurality of access paths defined in a scripting language architecture with an access path module.

6. The computer-implemented method of claim 1, wherein the extension compiler module is configured to control a semantic analysis by specifying evaluation properties and restricting access to a scripting language architecture with a property handling module.

7. The computer-implemented method of claim 1, wherein the extension compiler module is configured to access a centralized meta data repository with a buffered retrieval of data from the centralized meta data repository with a meta data access module.

8. The computer-implemented method of claim 1, wherein the extension compiler module is configured to extend the scripting language of the compiler to new types with a type extension compiler module.

9. The computer-implemented method of claim 1, wherein the source code comprises a business object.

10. A system comprising:
    a machine consisting of at least one processor and memory;
    a compiler on the machine configured to receive a source code comprising a new keyword to a scripting language of the compiler;
    an extension compiler module coupled to the compiler, the extension compiler module configured to support the new keyword and process the source code,
    the extension compiler module is further configured to support various contexts by specifying snippet metadata describing the context in which the language is used and define different snippet signatures from the different runtime contexts,
    the compiler and extension compiler module configured to generate an executable machine code based on the source code.

11. The system of claim 10, wherein the compiler is configured to:
    analyze a syntax of the source code;
    analyze a semantic of the source code; and
    generate the executable machine code based on the syntax and semantic of the source code, the source code comprising a business object.

12. The system of claim 11, wherein the extension compiler module is configured to generate a new functionality from the new keyword in the compiler without modifying the syntax and the semantic of the source code.

13. The system of claim 10, wherein the extension compiler module further comprises:
    an extension method module configured to bind a method to an arbitrary type.

14. The system of claim 10, wherein the extension compiler module further comprises:

an access path module configured to enable access to a plurality of access paths defined in a scripting language architecture.

15. The system of claim 10, wherein the extension compiler module further comprises:

a property handling module configured to control a semantic analysis by specifying evaluation properties and restricting access to a scripting language architecture.

16. The system of claim 10, wherein the extension compiler module further comprises:

a meta data access module configured to access a centralized meta data repository with a buffered retrieval of data from the centralized meta data repository.

17. The system of claim 10, wherein the extension compiler module further comprises:

a type extension compiler module configured to extend the scripting language of the compiler to new types.

18. A non-transitory machine readable medium embodying a set of instructions that, when executed by one or more processors, causes the processor to perform a method, the method comprising:

receiving a source code at a compiler on a machine, the source code comprising a new keyword to a scripting language of the compiler;

processing the source code with an extension compiler module configured to support the new keyword without having to modify the syntax and semantic of the source code;

the extension compiler is further configured to support various contexts by specifying snippet metadata describing the context in which the language is used and define different snippet signatures from different runtime contexts; and generating an executable machine code based on a process of the extension compiler module and the compiler.

* * * * *